United States Patent [19]
Suzuki et al.

[11] Patent Number: 5,763,064
[45] Date of Patent: Jun. 9, 1998

[54] LAMINATE

[75] Inventors: Susumu Suzuki; Nobutaka Aomine; Hirokazu Seki; Yasuo Hayashi, all of Yokohama; Masashi Tada, Kashima-gun, all of Japan

[73] Assignee: Asahi Glass Company Ltd., Tokyo, Japan

[21] Appl. No.: 668,467

[22] Filed: Jun. 25, 1996

[30] Foreign Application Priority Data

Jun. 26, 1995 [JP] Japan .................. 7-159266

[51] Int. Cl.$^6$ .................................................. B32B 17/00
[52] U.S. Cl. .................. 428/216; 428/336; 428/426; 428/432; 428/457; 428/469; 428/472; 428/697; 428/698; 428/699; 428/701; 428/702; 359/582; 359/588; 359/585; 359/360
[58] Field of Search ............... 428/216, 336, 428/432, 433, 434, 697, 698, 699, 701, 702, 457, 469, 472; 359/359, 580, 585, 586, 360, 582, 588

[56] References Cited

U.S. PATENT DOCUMENTS

| | | | |
|---|---|---|---|
| 4,859,532 | 8/1989 | Oyama et al. | 428/336 |
| 4,898,789 | 2/1990 | Finley | 428/432 |
| 4,902,081 | 2/1990 | Huffer | 350/1.7 |
| 5,147,125 | 9/1992 | Austin | 359/359 |
| 5,201,926 | 4/1993 | Szczyrbowski et al. | 65/60.2 |
| 5,270,858 | 12/1993 | Dickey | 359/586 |

*Primary Examiner*—Archene Turner
*Attorney, Agent, or Firm*—Oblon, Spivak, McClelland, Maier & Neustadt, P.C.

[57] ABSTRACT

A laminate which comprises a transparent substrate, a first oxide layer comprising ZnO which contains at least one metal, a first metallic layer comprising Pd-containing Ag and a second oxide layer comprising $SnO_2$ or ZnO which contains at least one metal, wherein said layers are formed on the substrate in this order.

12 Claims, 5 Drawing Sheets

LAMINATE

The present invention relates to a laminate.

Glass plates having a high heat insulating properties called Low-E glass (Low Emissivity glass) have been used for window glass for housing. These glass plates exhibit a high transmittance in visible light region and a high reflectance to near infrared light and infrared light having a long wavelength of about 10 μm. Accordingly, when these glass plates are used, visible light in solar radiation can be taken into rooms while heat rays in the solar light can be prevented from entering into the rooms and discharge of heat in the rooms to the outside can be reduced. Thus, use of the Low-E glass prevents condensation of water on the window glass and reduces a load for heating rooms in a winter season. Further, a load for cooling can be reduced in a summer season.

As one of the Low-E glass, there has been known a glass plate on which a single layer of $SnO_2$ is formed. Such Low-E glass is prepared by an on-line spray method or a CVD method. The heat insulating properties of the Low-E glass is evaluated by the emissivity. As the value of the emissivity is smaller, the quality is better. The value of the above-mentioned Low-E glass is about 0.2.

As another example, there is a composite type wherein an Ag film and a transparent film are formed on a glass plate by a sputtering method. The emissivity of the Low-E glass of this type is as low as about 0.1. Usually, the Ag film is sandwiched by transparent films which reduces the reflectance of the Ag film while increasing the transmittance due to the interfering effect. Further, the transparent films protect the Ag film and improves the durability of the films in mechanical and chemical sense.

As the transparent film, an oxide film such as ZnO, $SnO_2$, titania or the like or a nitride film such as silicon nitride is used. In particular, a ZnO film is usually used since cost for material is inexpensive and the film forming rate is fast. As the film structure, there are three layers of Zno/Ag/Zno or five layers of ZnO/Ag/ZnO/Ag/ZnO. However, the later has a smaller emissivity.

A barrier layer is often inserted at the interface between Ag and ZnO in order to stabilize Ag. In particular, the barrier layer formed on the Ag layer is effective to prevent oxidization of Ag in an oxygen atmosphere when an oxide layer is formed by reactive sputtering on the Ag layer in an atmosphere containing oxygen. The Low-E glass using the Ag layer is lower in chemical and mechanical strength than the ordinary heat ray reflecting glass (so-called solar control glass). It is because the chemical and mechanical strength of the Ag layer is greatly lower than a film made of stainless steel, titania, $SnO_2$, titanium nitride, chromium nitride and so on which is used for the solar control glass. Therefore, the Low-E glass using the Ag layer can not usually be used as a single glass plate but it can be used as a double grazing glass or a laminated glass wherein the film surface is not exposed to the inside or the outside of a room.

The Low-E glass using the Ag layer is in particular inferior in the humidity resistance of film. When the Low-E glass is left in air with the film exposed, there takes place deterioration of the outer appearance, i.e., white spots (a defect of spot) or opaqueness in a few days. Accordingly, the Low-E glass had to be formed as a double glazing glass or a laminated glass immediately after forming the Ag layer.

Further, the Low-E glass using Ag is apt to be damaged. Even by slight contact with a hard material such as metal, or even with resin powder dispersed between glass plates for preventing close contact of them, the film surface might be damaged. Thus, the Low-E glass with the Ag layer required careful storage or handling until it was formed as a double glazing glass or a laminated glass.

The following mechanism can be considered on a conventional ZnO/Ag/barrier/ZnO series Low-E glass as to how a defect of opaqueness or a white spot takes place. Water vapor in air reaches the Ag film through pin holes in a ZnO film of the upper layer to cause an increased diameter of crystal due to oxidation and condensation of Ag. At the same time, a crack is caused in the ZnO film. Since the ZnO film has a high inner stress, it has poor adhesion properties to the undercoat layer, whereby separation of the ZnO film is resulted at the interface of Ag/ZnO or barrier/ZnO film. The opaqueness or the white spot is observed due to the scattering of light at the position where the film is separated.

There has been proposed to prevent the separation of the ZnO film by adding a second element to ZnO to reduce an inner stress in the ZnO film whereby the adhesive properties of the ZnO film of upper layer to Ag is improved (Japanese Unexamined Patent Publication No. 357025/1992). However, the proposed method was insufficient to satisfy the humidity resistance properties practically required.

It is an object of the present invention to provide a laminate using Ag wherein the humidity resistance and the scratch resistance are improved.

In accordance with the present invention, there is provided a laminate which comprises a transparent substrate, a first oxide layer comprising ZnO which contains at least one metal, a first metallic layer comprising Pd-containing Ag and a second oxide layer comprising $SnO_2$ or ZnO which contains at least one metal, wherein these layers are formed on the substrate in this order. The above-mentioned laminate is referred to as an Ag-single layer type laminate.

Further, in accordance with the present invention, there is provided a laminate which comprises a transparent substrate, a first oxide layer comprising ZnO which contains at least one metal, a first metallic layer comprising Pd-containing Ag, a second oxide layer comprising ZnO which contains at least one metal, a second metallic layer comprising Pd-containing Ag, and a third oxide layer comprising $SnO_2$ or ZnO which contains at least one metal, wherein these layers are formed on the substrate in this order. The above-mentioned laminate is referred to as a Ag-double layer type laminate.

Figure 1:
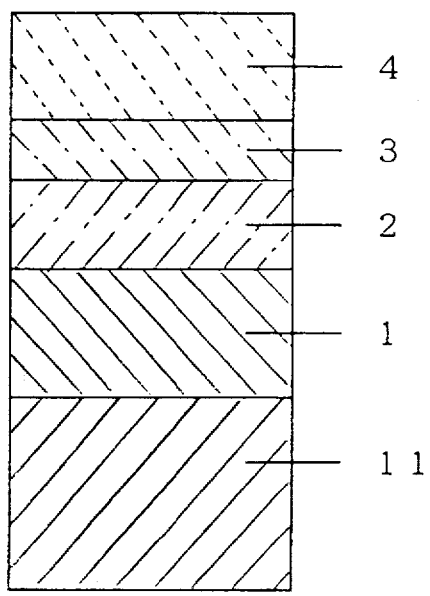
FIG. 1 is an enlarged cross-sectional view of an embodiment of the laminate of the present invention.
Figure 2:
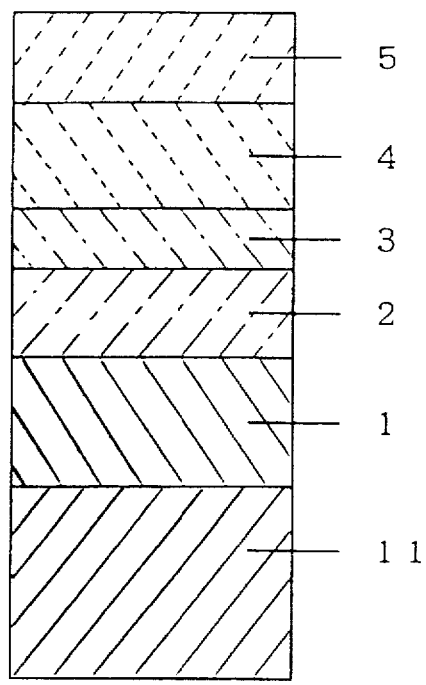
FIG. 2 is an enlarged cross-sectional view of another embodiment of the laminate of the present invention.
Figure 3:
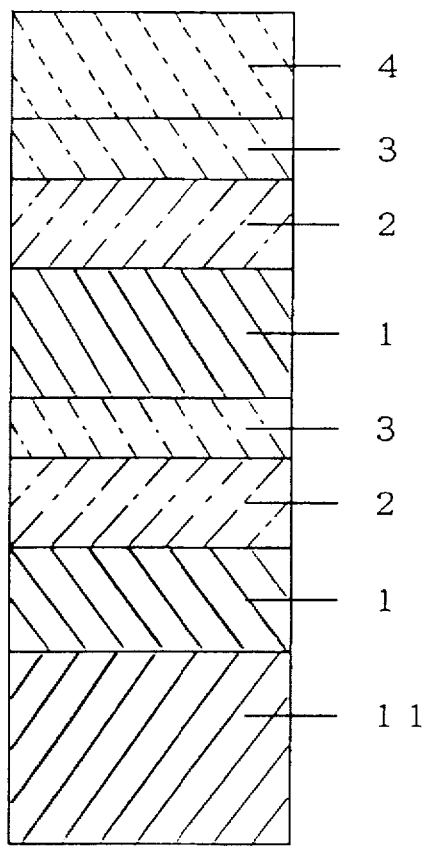
FIG. 3 is an enlarged cross-sectional view of another embodiment of the laminate of the present invention.
Figure 4:
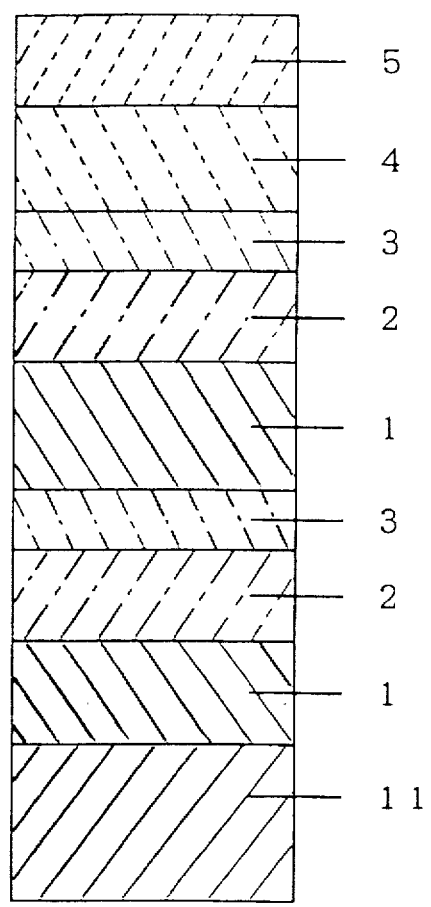
FIG. 4 is an enlarged cross-sectional view of another embodiment of the laminate of the present invention.

Preferred embodiments of the present invention will be described with reference to the drawings wherein the same reference numerals designate the same or corresponding portions. In FIGS. 1 to 4 showing several embodiments of the laminate of the present invention, reference numeral 11 designates a transparent substrate, numeral 1 designates an oxide layer comprising ZnO which contains at least one metal, numeral 2 designates a metallic layer comprising Pd-containing Ag, numeral 3 designates a layer of thin metallic film or nitride film, numeral 4 designates an oxide layer comprising $SiO_2$ or ZnO which contains at least one metal, and numeral 5 designates an oxide layer comprising Si-containing $SnO_2$.

The ZnO containing at least one metal may be ZnO which contains at least one selected from the group consisting of Sn, Al, Cr, Ti, Si, B, Mg and Ga.

When the oxide layer comprising ZnO containing at least one metal which is formed on an Ag layer, is used, the content of the metal is preferably 1–10 at % based on the total amount of the metal and Zn. When the content is less than 1 at %, the inner stress of the ZnO film can not be sufficiently reduced, and the adhesion properties between the ZnO film and the Ag layer is not improved with the result that the humidity resistance of the laminate is not improved. Further, when the content is more than 10 at %, the humidity resistance is also reduced. It is considered that an increased proportion of the metal to be contained reduces the crystallizability of ZnO and the compatibility to Ag may decrease. In consideration of obtaining in a stable manner the ZnO film having a low inner stress with good reproducibility in addition to considering the crystallizability of ZnO, the proportion of the metal to be contained is preferably 2–6 at %.

Also, with respect to the first oxide layer comprising ZnO which contains at least one metal, which is formed on the substrate, when it has a lower inner stress, the adhesive properties can be increased as a result of improving the humidity resistance of the laminate. However, when the proportion of the metal to be contained is excessive, the crystallizability of ZnO which is necessary to stabilize Ag is reduced. Accordingly, the proportion of the metal to be contained is preferably 1–10 at %, in particular, 2–6 at %.

There is in particular no limitation to the film thickness, and it can be suitably adjusted so as to satisfy a requisite optical performance. The proportion of Pd to be contained in the metallic layer comprising Pd-containing Ag (hereinbelow, referred to as Pd-Ag) is preferably 0.3–10 at % based on the total amount of Pd and Ag.

When the content is less than 0.3 at %, the effect of stabilizing Ag is reduced. On the other hand, when the content is more than 10.0 at %, the effect of stabilization is also reduced. Although when an amount of Pd to be added is increased within a range up to 10.0%, the humidity resistance is improved. However, an amount of Pd to be added is excessive, the film forming rate is reduced, the transmittance to visible light is reduced, and the emissivity is increased. Accordingly, from the above-mentioned viewpoint, an amount of Pd to be added is preferably 5.0 at % or less. Further, when the amount of Pd to be added is increased, the target cost is substantially increased. Accordingly, in considering the humidity resistance which is generally required, a range of about 0.5–2.0 at % is preferable.

It is preferable that the Ag-single layer type laminate has a layer of thin metallic film or a layer of nitride film between the first metallic layer and the second oxide layer.

The Ag-double layer type laminate preferably has a layer of thin metallic film or a layer of nitride film between the first metallic layer and the second oxide layer and/or between the second metallic layer and the third oxide layer.

The layer of thin metallic film or the layer of nitride film functions as a barrier layer to prevent Ag from oxidization. The thin metallic film or the nitride film may preferably be a film containing Ti, Zn, Ta, NiCr, $SiN_x$ as major component. A film thickness of 1–5 nm is preferred. When the thickness is less than 1 nm, function as the barrier layer is insufficient. When the thickness is more than 5 nm, the transmittance of the film is reduced. $SiN_x$ is a transparent nitride film. In this case, the upper limit of the film thickness is not in particular limited.

In the Ag-single layer type laminate, it is preferable that a Si-containing $SnO_2$ film is formed at the outer side of the second oxide layer. In the Ag-double layer type laminate, it is preferable that a Si-containing $SnO_2$ film is formed at the outer side of the third oxide layer.

It is preferable that the proportion of the content of Si to the total amount of Sn and Si in the Si-containing $SnO_2$ is 5–95 at %, more preferably, 30–90 at %, in particular, 40–90 at %.

The Si-containing $SnO_2$ film improves the barrier properties to water and improves the scratch resistance of the film structure. Due to the presence of Si in $SnO_2$, there is a change of film from a crystal structure to an amorphous structure whereby the film becomes dense. When the proportion of Si to be added is too small, the barrier properties of the film is reduced. Further, the film is of a crystalline form rather than an amorphous form so that smoothness of the film surface is lost, whereby the scratch resistance properties of the film are decreased. On the other hand, when the proportion of Si is excessive, arcing is apt to occur at the time of forming the film by a direct current sputtering method, and producibility is decreased.

Although there is in particular no limitation of the film thickness of the oxide layer comprising Si-containing $SnO_2$, a thickness of at least about 5 nm is necessary in order to improve the humidity resistance properties and the scratch resistance properties. As the film thickness is increased, the humidity resistance properties and the scratch resistance properties are improved. The upper limit of the film thickness is not in particular limited. However, a thickness of 20 nm provides a sufficient performance.

The feature of the present invention resides in a stable combination of these films as described above. A combination with another film does not improve the humidity resistance properties and the scratch resistance properties in comparison with the above-mentioned combination. The inventors of this application have made extensive study on the combination of films. As a result, they have found that the above-mentioned combination is most suitable.

The oxide layer formed under the Ag layer, a film including ZnO as the major component is most suitable. It is because the crystal structure of ZnO is hexagonal, which is normally oriented with respect to a C axis when the film is formed by sputtering on a glass substrate, then the Ag film of face-centered cubic lattice exhibits an orientation (111) to thereby stabilize Ag.

Use of the same material as the oxide layer to be formed on Ag is advantageous in that the number of targets can be saved when the film is formed by multi-paths with use of an in-line type sputtering device.

Incorporation of Pd in the Ag film to improve the durability to chemicals of the Ag film has been known in Japanese Unexamined Patent Publication No. 131449/1984. The incorporation of Pd effects immobilization of Ag atoms, i.e. reduction of migration of a Ag. However, use of the Pd-containing Ag does not have direct connection to the improvement of the humidity resistance properties of the Low-E glass. It is important to chose the kind of the oxide layer to be formed on the Ag film.

Concerning the oxide layer to be formed on the Ag film also, the above-mentioned film comprising ZnO as the major component is preferably used to improve the durability of the film. However, use of pure ZnO increases the inner stress; the adhesion properties at the interface of Ag/ZnO is insufficient, and the humidity resistance properties are poor. Further, it has low scratch resistance properties. In this case, even when the Pd-containing Ag is used, there is little improvement of the durability of the film.

On the other hand, there has been known to improve the humidity resistance properties by using a film having a reduced inner stress by adding an element having a smaller ionic radius than $Zn^{2+}$ to ZnO even in a case of using pure Ag (Japanese Unexamined Patent Publication No. 357025/1992).

An element to be added to reduce the inner stress may be Sn, Al, Cr, Ti, Si, B, Mg, Ga and so on.

The inventors have examined various kinds of combination of Pd-Ag and ZnO to which various kinds of metal are added. As a result, they have found Al-containing ZnO or Zn-containing ZnO to be preferable. The oxide layer comprising Al-containing ZnO or Sn-containing ZnO has good compatibility with the metallic layer comprising Pd-Ag, and the combination of both of the materials the humidity resistance properties can be remarkably improved.

In particular, Al is inexpensive and the film forming rate of the Al-containing ZnO film is high. The oxide layer comprising Al-doped ZnO has good compatibility with the metallic layer comprising Pd-Ag.

It can be considered that the crystal structure of Al is the same as that of Ag or Pd. Accordingly, even in a case that Al deposits on the particles or the interface of ZnO, good matching properties would be provided at the interface between Al and Ag or Pd in an atomic scale.

Further, Sn is a preferred material as described before since it is relatively inexpensive. In particular, a change of reflection color viewed from the side of the film surface when the Sn-containing ZnO film is left in an atmosphere of high humidity for a long term is smaller than a change in a case of the Al-containing ZnO film.

When Al doped ZnO or Sn doped ZnO is used in combination of pure Ag, the humidity resistance properties can not be improved as expected because Ag is not sufficiently stabilized.

The effect of improving the humidity resistance by Pd-Ag can be obtained by using the ZnO film of low inner stress wherein Sn, Al, Cr, Ti, Si, B, Mg, Ga or the like is contained in the oxide film.

Description has been made as to use of the ZnO type oxide film as the oxide layer formed on the Ag film. However, $SnO_2$ may be used for the film other than the ZnO type oxide film. $SnO_2$ also has good compatibility with Ag, and it greatly improves the humidity resistance properties of the film. In this case, however, the scratch resistance properties are slightly lowered in comparison with use of the Sn-containing ZnO film or the Al-containing ZnO film.

On the other hand, when a film of low inner stress, which contains $TiO_2$ for instance, is used, it does not improve the humidity resistance properties as expected in comparison with the ZnO film, and the scratch resistance properties are slightly reduced. Further, when $Ta_2O_5$ is used, the humidity resistance properties are improved in comparison with the ZnO film. However, the scratch resistance properties are greatly reduced.

In order to compensate the reduction of the scratch resistance properties, it can be considered to chose as the barrier layer a material having good compatibility with both the Ag layer and the oxide layer to be formed on the Ag layer. However, the film thickness of the barrier layer is usually about several nm, and it is difficult to greatly improve the scratch resistance properties.

The Si-containing $SnO_2$ film to be formed as the outermost layer has good compatibility with a film containing ZnO as the major component or the $SnO_2$ film, and provides strong adhesion properties at the interface. Accordingly, when the Sn-containing $SnO_2$ film is used as an overcoat layer, invasion of water into the film structure can be reduced, and a change of reflection color viewed from the side of the film surface due to deterioration of the film when it is left in an atmosphere of high humidity for a long term can be greatly reduced.

The color tone of the laminate, which is viewed from the side of the glass substrate, of the present invention will be described. In the Ag-double layer type laminate, when the thickness of the first metallic layer is adjusted to be within a range of 50% to 70%, particularly, 55% to 65% of the thickness of the second metallic layer, a reflection color of thin green can be obtained. Further, the reflection color does not change even when it is looked from an oblique direction.

Japanese Unexamined Patent Publication No. 165442/1995 discloses that the optical outer appearance of an outer reflection is substantially constant regardless of an incident angle by adjusting the thickness of the first layer of infrared ray reflecting metal to be about 50%–80% of the thickness of the second layer of infrared ray reflecting metal. However, the characteristics of changing the color tone by the incident angle are greatly changed depending on the kinds of infrared ray reflecting metal used.

Figure 5:
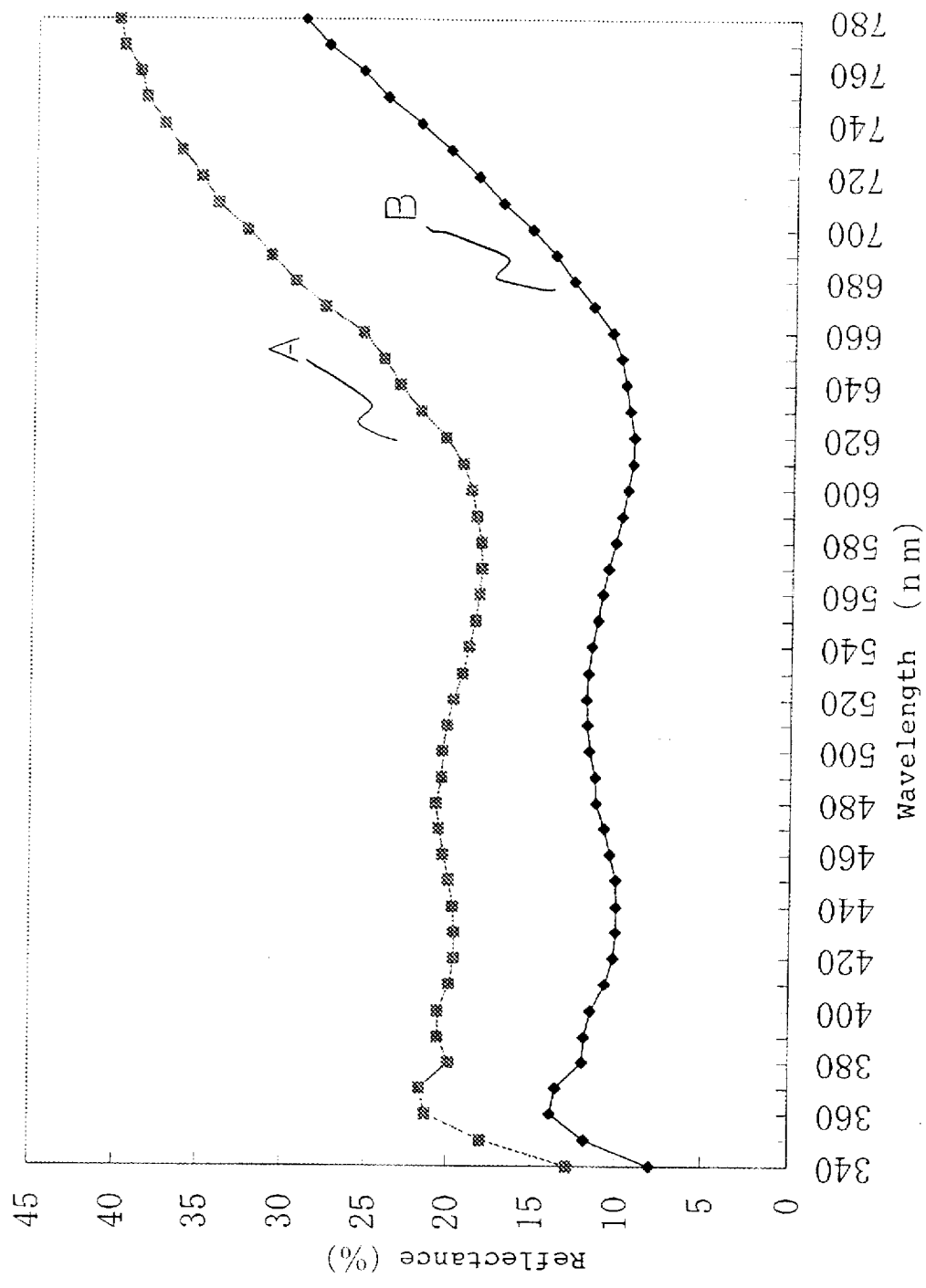
FIG. 5 is a graph showing spectral reflection curves in a relation of reflectivity to wavelength.

FIG. 5 is a graph showing a spectral reflection curve (indicated by B) when an incident angle is 0° and a spectral reflection curve (indicated by A) when an incident angle is 60° in a Ag-double layer type laminate. In FIG. 5, by changing the incident angle from 0° to 60°, a rising point of reflection appearing at a long wavelength side is shifted to a short wavelength side. As a result of the shift, reflection of light in a long wavelength region becomes relatively high so that a change of the color tone is recognized (specifically, the color tone includes a red tone). Namely, when the rising point of reflection at the long wavelength side is suppressed to be low as possible, a change of color tone becomes small.

The feature of the laminate of the present invention is to include Pd in Ag. As described before, although the inclusion of Pd stabilizes Ag, the resistance value of Pd-Ag increases in comparison with that of pure Ag. The rising point at a long wavelength side of the spectral reflection curve is related to the resistance value, and a higher resistance value tends to provide a slow rising form.

Namely, the laminate of the present invention provides a slow rising form at a long wavelength side of the spectral reflection curve in comparison with a case of using pure Ag, which functions desirably to a change of the color tone depending on the incident angle. Namely, in accordance with the present invention, a change of the color tone of reflection light depending on the incident angle can be suppressed to be lower than that disclosed in Japanese Unexamined Patent Publication No. 165442/1995.

In the Ag-double layer type laminate of the present invention, a preferred film structure to obtain a reflection color of thin green is such that the geometric film thickness of the first oxide layer (the film thickness referred to hereinbelow means the geometric film thickness) is 30–37 nm; the film thickness of the first metallic layer is 6.5–8.0 nm; the film thickness of the second oxide layer is 58.5–71.5 nm; the film thickness of the second metallic layer is 10.5–12.5 nm and the film thickness of the third oxide layer is 22.5–27.5 nm. The film thickness of these layers are appropriately adjusted to obtain a desired thin green color.

A method of forming these films is not in particular limited, and a vapor deposition method, a CVD method or the like may be used. However, a DC sputtering method is effectively used to a substrate having a large surface area such as a window glass.

The substrate used in the present invention may be a transparent substrate made of resin other than glass. Such substrate can be used for a wall sheet for a hothouse for instance.

In the present invention, the crystallizability of Ag is increased to stabilize Ag by using an oxide layer comprising ZnO which contains at least one metal, as the oxide layer to be formed under the Ag layer.

A danger of separation at the interface between the Ag layer and the oxide layer due to the lower inner stress of the oxide layer can be reduced by using the oxide layer comprising $SnO_2$ or ZnO which contains at least one metal, as the oxide layer to be formed on the Ag layer, and the durability of the film system can be improved.

Further, use of Pd-Ag stabilizes Ag itself in comparison with pure Ag, i.e. Ag which does not contain Pd.

Use of the oxide layer comprising Si-containing $SnO_2$ reduces invasion of water into the film structure. Further, since the friction coefficient of the surface of the oxide layer is small, the scratch resistance properties of the film structure can be improved.

[Examples]

In the following Examples and Comparative Examples, a Low-E film is formed on each of glass substrates by film-forming conditions shown in Table 1 to obtain a number of Low-E glass.

In Table 1, 5 Al-ZnO means ZnO which contains 5 at % of Al based on the total amount of Al and Zn, and 5 Al-Zn means Zn which contains 5 at % of Al based on the total amount of Al and Zn. Further, 1 Pd-Ag means Ag which contains 1 at % of Pd based on the total amount of Pd and Ag. In the following, the same definitions are applied. Further, $SnSiO_x$ means a composite oxide of Sn and Si where the atomic ratio of Sn:Si is 1:1, and SnSi means an alloy of Sn and Si where the atomic ratio of Sn and Si is 1:1.

In measuring the humidity resistance properties of the Low-E glasses obtained, they were kept in a constant temperature and humidity container of 40° C. and 90% RH for 3 weeks, and the number of white spots of a diameter of 0.2-2 mm (the number in an area of 10 cm×10 cm) produced in the film surface was counted by eyes.

With respect to the scratch resistance properties of the Low-E glass, the critical load at the film separation was measured with a scratch tester of CSR-02 Model by Rhesca. As conditions of testing, a diamond needle (R at the edge=50 µm) was used; the inclination angle to the substrate was 4° and the moving speed on the substrate was 15 µm/sec.

A change of reflection color viewed from the side of the film surface of the Low-E glass was obtained by measuring variations $\Delta x$ and $\Delta y$ on x and y of a CIE chromaticity coordinate before and after the storage of the Low-E glass. Symbols ○, Δ and X were given when $[(\Delta x)^2+(\Delta y)^2]^{1/2}$ is 0.0000-0.0100, 0.0101-0.0200 and 0.0201 or more, respectively.

[EXAMPLE 1]

A float glass plate of a thickness of 2 mm was washed and set in a sputtering device. Air in the device was discharged to the order of $10^{-6}$ Torr. In accordance with the conditions in Table 1, four-layered film of 5 Al-Zno (film thickness of 40 nm)/1 Pd-Ag (10 nm)/5 Al-Zn (barrier layer of 2 nm)/5 Al-ZnO (40 nm) was formed. The humidity resistance properties and the scratch resistance properties of the Low-E glass were measured. A result of test is shown in Table 2. In Table 2, a character G means the float glass plate of 2 nm, and figures in brackets indicate film thickness where unit is nm. The same definitions are applicable in the following.

It was found that the Low-E glass had a sufficient strength of film in practical use.

[EXAMPLES 2 to 24]

In the same manner as in Example 1, various kinds of Low-E films as shown in Table 2 were formed on float glass substrates of a thickness of 2 mm to obtain various kinds of Low-E glass. The humidity resistance properties and the scratch resistance properties of the Low-E glass were measured. A result of tests is shown in Table 2.

The Low-E glass obtained has a sufficient strength of film in practical use.

The color tone of reflection light from the side of the glass substrate in Example 21 was indicated by a*4.5, b*1.3 in a L*a*b* type coordinate and showed a reflection color tone of thin green color. In observation from an oblique direction, a slightly strong blue tone was shown.

The reflection color tone from the side of the glass substrate in Example 22 was indicated by a*3.0, b*–1.5 in a L*a*b* type coordinate, and it had stronger blue tone than the color tone of Example 21. However, in observation from an oblique direction, there is no substantial change in the color tone.

[COMPARATIVE EXAMPLES 1 to 8]

In the same manner as in Example 1, various kinds of Low-E film shown in Table 3 were formed on float glass substrates of a thickness of 2 mm to form various kinds of Low-E glass. The humidity resistance properties and the scratch resistance properties of the Low-E glass were measured. A result of tests is shown in Table 3. It was confirmed that each of the Low-E glass in Comparative Examples 1 to 4 is inferior in the humidity resistance properties and the scratch resistance properties in comparison with the Low-E glass in Examples 1 to 10.

Further, it was confirmed that each of the Low-E glass in Comparative Examples 5 to 8 is inferior in humidity resistance properties and the scratch resistance properties in comparison with the Low-E glass in Examples 11 to 20.

TABLE 1

| Film | Target | Gas introduced (flow rate ratio) | Pressure (mTorr) | Input power (W/cm²) |
| --- | --- | --- | --- | --- |
| Zno | Zn | $O_2$ (100%) | 2 | 3.6 |
| Zn | Zn | Ar (100%) | 2 | 2.0 |
| 5Al—ZnO | 5Al—Zn | $O_2$ (100%) | 2 | 3.6 |
| 5Al—Zn | 5Al—Zn | Ar (100%) | 2 | 2.0 |
| 3Al—ZnO | 3Al—Zn | $O_2$ (100%) | 2 | 3.6 |
| 3Al—Zn | 3Al—Zn | Ar (100%) | 2 | 2.0 |
| 3Sn—ZnO | 3Sn—Zn | $O_2$ (100%) | 2 | 3.6 |
| 3Si—ZnO | 3Si—Zn | $O_2$ (100%) | 2 | 3.6 |
| 3Ti—ZnO | 3Ti—Zn | $O_2$ (100%) | 2 | 3.6 |
| Ag | Ag | Ar (100%) | 2 | 0.8 |
| 0.3Pd—Ag | 0.3Pd—Ag | Ar (100%) | 2 | 0.8 |
| 0.5Pd—Ag | 0.5Pd—Ag | Ar (100%) | 2 | 0.8 |
| 1Pd—Ag | 1Pd—Ag | Ar (100%) | 2 | 0.8 |
| 3Pd—Ag | 3Pd—Ag | Ar (100%) | 2 | 0.8 |
| 5Pd—Ag | 5Pd—Ag | Ar (100%) | 2 | 0.8 |
| $SnSiO_x$ | SnSi | Ar/$O_2$ (= 2/3) | 2 | 5.5 |
| $SnO_2$ | Sn | Ar/$O_2$ (= 1/4) | 2 | 2.7 |
| $Ta_2O_5$ | Ta | Ar/$O_2$ (= 1/1) | 2 | 5.5 |
| $TiO_2$ | Ti | Ar/$O_2$ (= 1/1) | 2 | 5.5 |

TABLE 2

| Example | Film structure | *1) | *2) | *3) |
|---|---|---|---|---|
| 1 | G/5Al—ZnO(40)/1Pd—Ag(10)/5Al—Zn(2)/5Al—ZnO(40) | 0 | 18 | Δ |
| 2 | G/5Al—ZnO(40)/1Pd—Ag(10)/5Al—Zn(2)/3Sn—ZnO(40) | 0 | 18 | Δ |
| 3 | G/5Al—ZnO(40)/1Pd—Ag(1a)/5Al—Zn(2)/5Al—ZnO(20)/SnSiO$_x$(20) | 0 | 22 | Δ |
| 4 | G/5Al—ZnO(40)/1Pd—Ag(10)/5Al—Zn(2)/3Sn—ZnO(20)/SnSiO$_x$(20) | 0 | 22 | ○ |
| 5 | G/5Al—ZnO(40)/1Pd—Ag(10)/5Al—Zn(2)/SnO$_2$(40) | 0 | 16 | ○ |
| 6 | G/5Al—ZnO(40)/1Pd—Ag(10)/5Al—Zn(2)/SnO$_2$(20)/SnSiO$_x$(20) | 0 | 20 | ○ |
| 7 | G/5Al—ZnO(40)/0.3Pd—Ag(10)/5Al—Zn(2)/5Al—ZnO(20)/SnSiO$_x$(20) | 10 | 22 | ○ |
| 8 | G/5Al—ZnO(40)/0.5Pd—Ag(10)/5Al—Zn(2)/5Al—ZnO(20)/SnSiO$_x$(20) | 5 | 22 | ○ |
| 9 | G/5Al—ZnO(40)/3Pd—Ag(10)/5Al—Zn(2)/5Al—ZnO(20)/SnSiO$_x$(20) | 0 | 22 | ○ |
| 10 | G/5Al—ZnO(40)/5Pd—Ag(10)/5Al—Zn(2)/5Al—ZnO(20)/SnSiO$_x$(20) | 0 | 22 | ○ |
| 11 | G/5Al—ZnO(40)/1Pd—Ag(10)/5Al—Zn(2)/5Al—ZnO(80)/1Pd—Ag(10)/5Al—Zn(2)/5Al—ZnO(40) | 0 | 20 | Δ |
| 12 | G/5Al—ZnO(40)/1Pd—Ag(10)/5Al—Zn(2)/5Al—ZnO(80)/1Pd—Ag(10)/5Al—Zn(2)/3Sn—ZnO(40) | 0 | 20 | Δ |
| 13 | G/5Al—ZnO(40)/1Pd—Ag(10)/5Al—Zn(2)/5Al—ZnO(80)/1Pd—Ag(10)/5Al—Zn(2)/5Al—ZnO(20)/SnSiO$_x$(20) | 0 | 25 | Δ |
| 14 | G/5Al—ZnO(40)/1Pd—Ag(10)/5Al—Zn(2)/5Al—ZnO(80)/1Pd—Ag(10)/5Al—Zn(2)/3Sn—ZnO(20)/SnSiO$_x$(20) | 0 | 25 | ○ |
| 15 | G/5Al—ZnO(40)/1Pd—Ag(10)/5Al—Zn(2)/5Al—ZnO(80)/1Pd—Ag(10)/5Al—Zn(2)/SnO$_2$(40) | 0 | 17 | ○ |
| 16 | G/5Al—ZnO(40)/1Pd—Ag(10)/5Al—Zn(2)/5Al—ZnO(80)/1Pd—Ag(10)/5Al—Zn(2)/SnO$_2$(20)/SnSiO$_x$(20) | 0 | 22 | ○ |
| 17 | G/5Al—ZnO(40)/0.3Pd—Ag(10)/5Al—Zn(2)/5Al—ZnO(80)/0.3Pd—Ag(10)/5Al—Zn(2)/5Al—ZnO(20)/SnSiO$_x$(20) | 10 | 25 | ○ |
| 18 | G/5Al—ZnO(40)/0.5Pd—Ag(10)/5Al—Zn(2)/5Al—ZnO(80)/0.5Pd—Ag(10)/5Al—Zn(2)/5Al—ZnO(20)/SnSiO$_x$(20) | 5 | 25 | ○ |
| 19 | G/5Al—ZnO(40)/3Pd—Ag(10)/5Al—Zn(2)/5Al—ZnO(80)/3Pd—Ag(10)/5Al—Zn(2)/5Al—ZnO(20)/SnSiO$_x$(20) | 0 | 25 | ○ |
| 20 | G/5Al—ZnO(40)/5pd—Ag(10)/5Al—Zn(2)/5Al—ZnO(80)/5Pd—Ag(10)/5Al—Zn(2)/5Al—ZnO(20)/SnSiO$_x$(20) | 0 | 25 | ○ |
| 21 | G/5Al—ZnO(34)/1Pd—Ag(7)/5Al—Zn(2)/5Al—ZnO(65)/1Pd—Ag(12)/5Al—Zn(2)/5Al—ZnO(25) | 0 | 20 | Δ |
| 22 | G/5Al—ZnO(34)/1Pd—Ag(7.5)/5Al—Zn(2)/5Al—ZnO(65)/1Pd—Ag(12)/5Al—Zn(2)/5Al—ZnO(26.5) | 0 | 20 | Δ |
| 23 | G/3Si—ZnO(40)/1Pd—Ag(10)/5Al—Zn(2)/3Si—ZnO(40) | 0 | 18 | X |
| 24 | G/3Ti—ZnO(40)/1Pd—Ag(10)/5Al—Zn(2)/3Ti—ZnO(40) | 0 | 18 | X |

*1): Number of white spot, *2): Critical load (g), *3): Change of reflection color viewed from the side of the film surface

TABLE 3

| Comp. ex. | Film structure | *1) | *2) | *3) |
|---|---|---|---|---|
| 1 | G/ZnO(40)/Ag(10)/Zn(2)/ZnO(40) | 300 | 15 | ○ |
| 2 | G/3Al—ZnO(40)/Ag(10)/3Al—Zn(2)/3Al—ZnO(40) | 280 | 17 | Δ |
| 3 | G/5Al—ZnO(40)/1Pd—Ag(10)/5Al—Zn(2)/Ta$_2$O$_5$(20)/SnSiO$_x$(20) | 0 | 5 | ○ |
| 4 | G/5Al—ZnO(40)/1Pd—Ag(10)/5Al—Zn(2)/TiO$_2$(20)/SnSiO$_x$(20) | 50 | 15 | ○ |
| 5 | G/ZnO(40)/Ag(10)/Zn(2)/ZnO(80)/Ag(10)/Zn(2)/ZnO(40) | 350 | 15 | ○ |
| 6 | G/3Al—ZnO(40)/Ag(10)/3Al—Zn(2)/3Al—ZnO(80)/Ag(10)/3Al—Zn(2)/3Al—ZnO(40) | 300 | 17 | Δ |
| 7 | G/5Al—ZnO(40)/1Pd—Ag(10)/5Al—Zn(2)/5Al—ZnO(80)/1Pd—Ag(10)/5Al—Zn(2)/Ta$_2$O$_5$(20)/SnSiO$_x$(20) | 0 | 5 | ○ |
| 8 | G/5Al—ZnO(40)/1Pd—Ag(10)/5Al—Zn(2)/5Al—ZnO(80)/1Pd—Ag(10)/5Al—Zn(2)/TiO$_2$(20)/SnSiO$_x$(20) | 100 | 13 | ○ |

*1): Number of white spot, *2): Critical load (g), *3): Change of reflection color viewed from the side of the film surface According to the laminate of the present invention, the humidity resistance properties can be improved, whereby packaging in storaging and handling can be simple, an amount of moisture absorbing agent to be used can be reduced and the manufacturing cost can be reduced. Since the scratch resistance properties are also improved, a danger of causing a flow during the handling can be small. Accordingly, it is suitable for a Low-E glass.

What is claimed is:

1. A laminate which comprises a transparent substrate, a first oxide layer comprising ZnO which contains the metal Al, a first metallic layer comprising Pd-containing Ag wherein the content of the Pd is 0.3–10 at % based on the total amount of Pd and Ag and a second oxide layer comprising SnO$_2$ or ZnO containing the metal Sn and/or the metal Al wherein the content of the metal in each oxide layer comprising ZnO is 1–10 at % based on the total amount of the metal and Zn, and wherein said layers are formed on the substrate in the recited order.

2. The laminate according to claim 1, wherein a layer of thin metallic film or nitride film is interposed between the first metallic layer and the second oxide layer.

3. The laminate according to claim 1, wherein a Si-containing SnO$_2$ film is formed at the outer side of the second oxide layer.

4. The laminate according to claim 1, wherein the content of the metal in the ZnO is 2–6 at % based on the total amount of the metal and Zn.

5. The laminate according to claim 1, wherein the content of Pd in the Pd-containing Ag is 0.5–2.0 at % based on the total amount of Pd and Ag.

6. A laminate which comprises a transparent substrate, a first oxide layer comprising ZnO which contains the metal Al, a first metallic layer comprising Pd-containing Ag, a second oxide layer comprising ZnO which contains the metal Al, a second metallic layer comprising Pd-containing Ag, wherein the content of the Pd is 0.3–10 at % based on the total amount of Pd and Ag in each Pd-containing Ag layer and a third oxide layer comprising SnO$_2$ or ZnO containing the metal Sn and/or the metal Al, wherein the content of the metal in each oxide layer comprising ZnO is 1–10 at % based on the total amount of the metal and Zn, wherein said layers are formed on the substrate in the recited order.

7. The laminate according to claim 6, wherein a layer of thin metallic film or nitride film is interposed between the first metallic layer and the second oxide layer and/or the second metallic layer and the third oxide layer.

8. The laminate according to claim 6, wherein a Si-containing $SnO_2$ film is formed at the outer side of the third oxide layer.

9. The laminate according to claim 6, wherein the thickness of the first metallic layer is 50–70% of the thickness of the second metallic layer.

10. The laminate according to claim 6, wherein the thickness of the first metallic layer is 6.5–8.0 nm, and the thickness of the second metallic layer is 10.5–12.5 nm.

11. The laminate according to claim 6, wherein the content of the metal in the ZnO is 2–6 at % based on the total amount of the metal and Zn.

12. The laminate according to claim 6, wherein the content of Pd in the Pd-containing Ag is 0.5–2.0 at % based on the total amount of Pd and Ag.

* * * * *